(No Model.)
G. C. MOORE.
FABRIC FOR BICYCLE TIRES.
No. 521,805. Patented June 26, 1894.
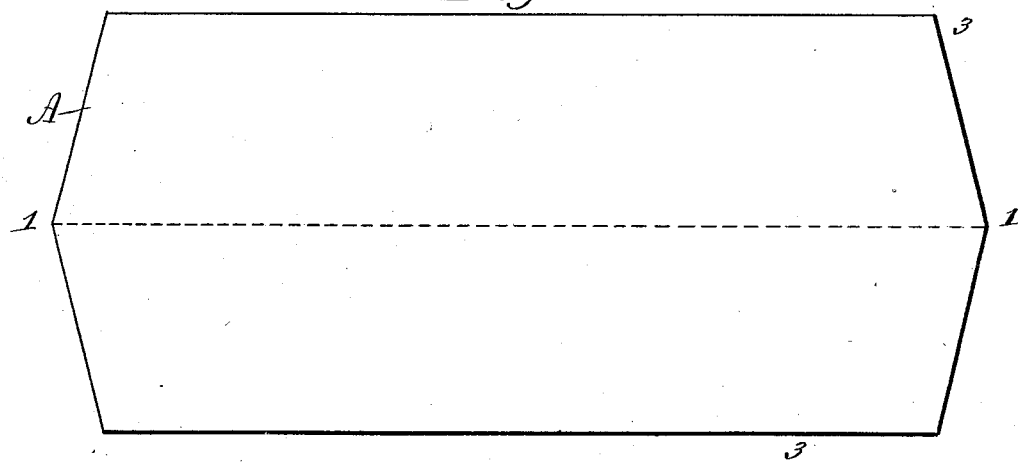
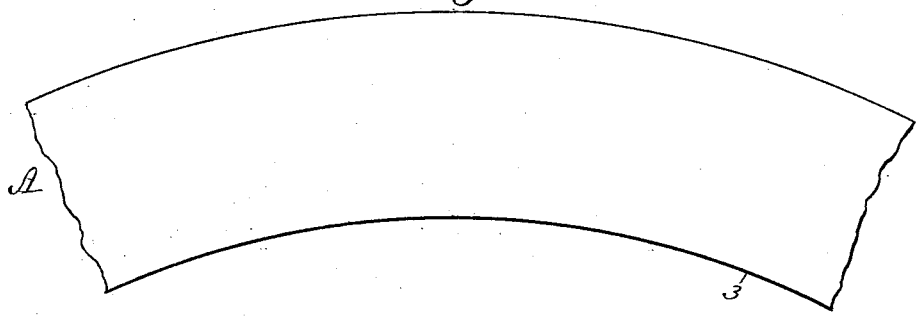
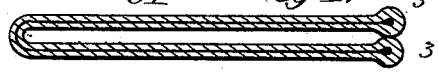
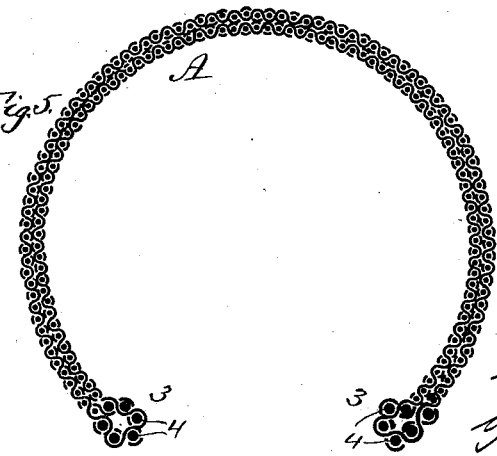
Witnesses
C. M. Sweeney.
Inventor:
George C. Moore,
by Henry Calver,
Attorney.

UNITED STATES PATENT OFFICE.

GEORGE C. MOORE, OF EASTHAMPTON, MASSACHUSETTS.

FABRIC FOR BICYCLE-TIRES.

SPECIFICATION forming part of Letters Patent No. 521,805, dated June 26, 1894.

Application filed January 12, 1894. Serial No. 496,663. (No specimens.)

*To all whom it may concern:*

Be it known that I, GEORGE C. MOORE, a citizen of the United States, residing at Easthampton, in the county of Hampshire and State of Massachusetts, have invented certain new and useful Improvements in Fabrics for Bicycle-Tires, of which the following is a specification, reference being had therein to the accompanying drawings.

In the production of the outer or tread portions of pneumatic tires for bicycles, or those portions which cover the inner air-tubes of the tires, great strength and durability are desired, so that the tires will not give out when subjected to severe and continued wear. It is also essential that the tire linings should naturally conform to the curvature of the wheels without puckering or without being unduly forced, so that the full strength thereof will not be impaired.

To produce a tire lining of the desired character, as above indicated, I weave a seamless tube in such a manner that it may be folded to form a double lining for the tire, the two parts or thicknesses thereof being so shaped that they will both have a gradual curve throughout their length so as to make a tire lining which will naturally form a complete and perfect circle. This result is effected by weaving a seamless tubular fabric two portions of which are longest, to form the outer circumference of the tire lining, said tubular fabric being shortest at two points midway between the said longest points, with gradual decrease in length between the longest and the shortest points.

The construction of the tubular fabric just described is preferably effected by feeding in the warps somewhat faster at the points where the said tubular fabric is to be longest than at the points where it is to be shortest, with proportionate or gradual decrease in the feed of the warps from the longest to the shortest parts of the tubular fabric, this feeding of the warps being preferably effected in an even, reliable and positive manner by the use of double frusto-conical take-up rolls.

In the drawings Figure 1 is a diagram illustrating the shape of a section or short portion of a tubular fabric embodying my invention, showing the same as it appears when flattened out. Fig. 2 represents the tubular fabric illustrated by Fig. 1 as the same appears when folded on its central line. Fig. 3 is a diagrammatic cross section of Fig. 1, and Fig. 4 a diagrammatic cross-section of Fig. 2. Fig. 5 is a diagram representing, approximately, the relative positions the parts will assume when in the made-up tire lining.

A denotes a doubled tubular seamless fabric which is to constitute the tire lining, both thicknesses of the same woven longest at the central part 1, preferably by feeding in the warps fastest at these parts, said tubular fabric being shortest at the parts 3 which are located midway between the parts 1 in the tubular fabric, while between the said longest and shortest parts the tubular fabric decreases gradually in length. This tubular fabric when flattened out, as shown in Fig. 1 and then again folded or bent over on its central line at parts 1 will represent the curved appearance shown by Fig. 2, and will form a double curved tube open along its inner or shorter side, as represented by Fig. 5.

A tubular fabric woven so as to be longest, and shortest, respectively, at the points above described, with gradual decrease in length from the longest to the shortest points, will, when folded as above described, constitute a double seamless fabric both thicknesses of which will have a gradual and uniform curve throughout their length so that they will naturally assume a complete circle without puckering and without being unduly stretched or forced when applied to the stretcher or former on which such fabric is laid when being glued or fastened together in getting it in readiness for the application thereto of the rubber portion of the tire. This doubled fabric being of heavy canvas or duck, and being thus naturally curved, will produce a smooth and shapely tire lining of great strength.

In making up the tire lining the same is generally provided with enlarged inner edges at the points 3, 3, this having usually been effected by the insertion of cords or wires into said edges between the folds of the lining, but I prefer to effect this result by the use of heavy linen warps 4 (Fig. 5) at the inner edges of the double open tube, or along the shortest portions of the tubular fabric, to produce a corded or beaded effect, these inner or enlarged edges being for the purpose of assisting in securing the tire to the rims of the wheels. This use of heavy warps at the inner or shorter edges of a doubled tire lining which has a gradual and continuous curve in the direction of its length is as applicable to a doubled lining one fold or thickness of which is open at the outer circumference of the lining, as described in my application, Serial No. 496,661, filed simultaneously herewith, as it is to a doubled seamless tube, and I do not therefore wish to limit this feature of my invention to the last-named form of tire lining.

Having thus described my invention, I claim and desire to secure by Letters Patent—

1. A fabric for lining pneumatic bicycle tires, woven to form a seamless tube having longitudinal portions of different lengths, two of such longitudinal portions being longest and two midway intermediate longitudinal portions being shortest, with gradual diminution in length between the longest and the shortest portions thereof, so that when said tube is folded longitudinally on its shortest portions and then doubled or curved over longitudinally on its longest portions it will form a double curved tube open along its inner side and adapted to form a complete circle.

2. A fabric for lining pneumatic bicycle tires, woven to form a seamless tube having longitudinal portions of different lengths, two of such longitudinal portions being longest and two midway intermediate longitudinal portions being shortest, with gradual diminution in length between the longest and the shortest portions thereof, and having heavier warps at its shortest portions than at its other parts, so that when said tube is folded longitudinally on its shortest portions and then doubled or curved longitudinally on its longest portions it will form a double curved tube open along its inner side and adapted to form a complete circle, with enlarged transverse or beaded edges formed by the heavy warps.

3. A doubled curved seamless fabric, for use in pneumatic bicycle tires, having longest warps at two longitudinal portions and shortest warps at two other longitudinal portions midway between the first named portions with gradual diminution in the lengths of the warps from the longest to the shortest thereof, so that when said fabric is folded along the line of its shortest warps and then folded or curved over along the line of its longest warps it will form a double curved tube open along its inner side.

4. A doubled curved seamless tubular fabric, for use in pneumatic bicycle tires, having longest warps at two longitudinal portions and shortest and very heavy warps at two other longitudinal portions midway between the first named portions, with gradual diminution in the lengths of the warps from the longest to the shortest thereof, so that when said fabric is folded along the line of its shortest warps and then folded or curved over along the line of its longest warps it will form a double curved tube open along its inner side, with edges which are enlarged transversely by the heavy warps.

In testimony whereof I affix my signature in presence of two witnesses.

GEORGE C. MOORE.

Witnesses:
 FRED. W. MESSERSCHMIDT,
 ALVIN J. MESSERSCHMIDT.